US012808811B2

(12) United States Patent
Nagata

(10) Patent No.: US 12,808,811 B2
(45) Date of Patent: Nov. 24, 2026

(54) HOLE INSPECTION LENS UNIT

(71) Applicant: AISIN CORPORATION, Kariya (JP)

(72) Inventor: Syotaro Nagata, Kariya (JP)

(73) Assignee: AISIN CORPORATION, Kariya (JP)

( * ) Notice: Subject to any disclaimer, the term of this patent is extended or adjusted under 35 U.S.C. 154(b) by 154 days.

(21) Appl. No.: 18/796,469

(22) Filed: Aug. 7, 2024

(65) Prior Publication Data

US 2025/0076206 A1 Mar. 6, 2025

(30) Foreign Application Priority Data

Aug. 29, 2023 (JP) ................................ 2023-138798

(51) Int. Cl.
*G01N 21/88* (2006.01)

(52) U.S. Cl.
CPC ..... *G01N 21/8806* (2013.01); *G01N 2201/08* (2013.01)

(58) Field of Classification Search
CPC ........... G01N 21/8806; G01N 2201/08; G01N 21/954; B23K 26/032; B23K 26/0622; B23K 26/38; B23K 26/53; H10P 72/0428
See application file for complete search history.

(56) References Cited

U.S. PATENT DOCUMENTS

2013/0093876 A1* 4/2013 Ishizuka ............ G02B 23/2492 348/82
2016/0231555 A1* 8/2016 Freifeld ................. H04N 23/55

FOREIGN PATENT DOCUMENTS

CN 110823924 A * 2/2020 ........... G01N 21/956
JP 2013-88136 A 5/2013
JP 2015-049044 A 3/2015
JP 2024-062839 A 5/2024

* cited by examiner

*Primary Examiner* — Tri T Ton
(74) *Attorney, Agent, or Firm* — Sughrue Mion, PLLC

(57) ABSTRACT

A hole inspection lens unit to inspect inside a hole formed in a workpiece including a tubular outer tube; a tubular inner tube inserted into the outer tube; an objective lens disposed in a tip end of the inner tube; a mounting unit to support proximal ends of the outer tube and the inner tube where a camera to image the inside of the hole through the objective lens is attached. Light emitting diodes disposed inside the outer tube and around the inner tube and a tubular light guide tube emit light to diffuse the light into the hole. An annular spacer with gas passages disposed between the light guide tube and outer peripheral surface of the inner tube and an inner peripheral surface of the outer tube communicate with an annular gas passage opens at the tip ends of the outer tube and the inner tube.

7 Claims, 5 Drawing Sheets

HOLE INSPECTION LENS UNIT

CROSS REFERENCE TO RELATED APPLICATIONS

This application is based on and claims priority under 35 U.S.C. § 119 to Japanese Patent Application 2023-138798, filed on Aug. 29, 2023, the entire content of which is incorporated herein by reference.

TECHNICAL FIELD

This disclosure relates to a hole inspection lens unit used for inspection inside a hole formed in a workpiece.

BACKGROUND DISCUSSION

In the related art, a hole defect detection device used for inspection inside a hole formed in a circuit substrate is known (see, for example, CN 110823924A (Reference 1)). The hole defect detection device includes a tubular outer casing, a rod mirror inserted into the outer casing, an objective lens disposed on a protective glass side of the rod mirror, and a connection sleeve which supports a proximal end portion of the outer casing and the rod mirror and to which a CCD camera is attached. Between an outer peripheral side of the objective lens and an inner peripheral side of the outer casing, an infrared light source processor formed of a fixed plate and a collimating lens are disposed. The collimating lens is surrounded by a tip end portion of the outer casing on the protective glass side of the infrared light source processor and surrounds the objective lens.

In the related art, an inspection method is known in which an insertion shaft provided with a wide angle lens at a tip end is inserted into a hole, and a wall surface of the hole is inspected based on an image through the wide angle lens (see, for example, JP 2013-088136A (Reference 2)). In the inspection method, when the wall surface of the hole is inspected, a gas is ejected toward a deep part of the hole along an outer peripheral surface of the insertion shaft. Accordingly, it is possible to remove a foreign matter such as water droplets and chips adhering to the wall surface of the hole. Further, in the inspection method, it is also known that when the wall surface of the hole is inspected, a first gas is ejected toward the deep part of the hole along the outer peripheral surface of the insertion shaft, and a second gas having a flow velocity higher than that of the first gas is ejected in the same direction as the first gas around the first gas (see, for example, JP 2015-049044A (Reference 3)).

In the hole defect detection device described in Reference 1, light from the infrared light source processor is emitted into the hole through the collimating lens having a property of straightly transmitting light in a specific direction. Therefore, when the hole defect detection device described in Reference 1 is used, there is a concern that uniform illuminance cannot be ensured inside a target hole and noise of an image captured by the CCD camera increases. On the other hand, when a foreign matter such as water droplets is present inside the hole, it is preferable that the foreign matter is removed by ejecting the gas toward the hole as described in References 2 and 3. However, even when the gas is ejected along the outer peripheral surface of the outer casing in the hole defect detection device described in Reference 1, there is a concern that the foreign matter cannot be satisfactorily removed from the wall surface of the hole or the like.

A need thus exists for a hole inspection lens unit which is not susceptible to the drawback mentioned above.

SUMMARY

A hole inspection lens unit according to this disclosure is a hole inspection lens unit used for inspection inside a hole formed in a workpiece. The hole inspection lens unit includes: a tubular outer tube; a tubular inner tube inserted into the outer tube; an objective lens disposed in a tip end of the inner tube; a mounting unit which supports a proximal end portion of the outer tube and a proximal end portion of the inner tube and on which a camera configured to image the inside of the hole through the objective lens is attached; a plurality of shell type light emitting diodes disposed inside the outer tube and around the inner tube; a tubular light guide tube which is surrounded by a tip end portion of the outer tube and supported by one of an outer peripheral surface of the inner tube and an inner peripheral surface of the outer tube to surround a tip end portion of the inner tube, and emits light emitted from the plurality of shell type light emitting diodes on a mounting unit side while diffusing the light into the hole; an annular spacer which has a plurality of gas passages and is disposed between the light guide tube and the other one of the outer peripheral surface of the inner tube and the inner peripheral surface of the outer tube such that the plurality of gas passages extend along the light guide tube; and an annular gas passage which is defined between the inner peripheral surface of the outer tube and an outer peripheral surface of the light guide tube or between the outer peripheral surface of the inner tube and an inner peripheral surface of the light guide tube, communicates with the plurality of gas passages of the spacer, and opens at the tip ends of the outer tube and the inner tube.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of the disclosure will be described with reference to the drawings.

Figure 1:
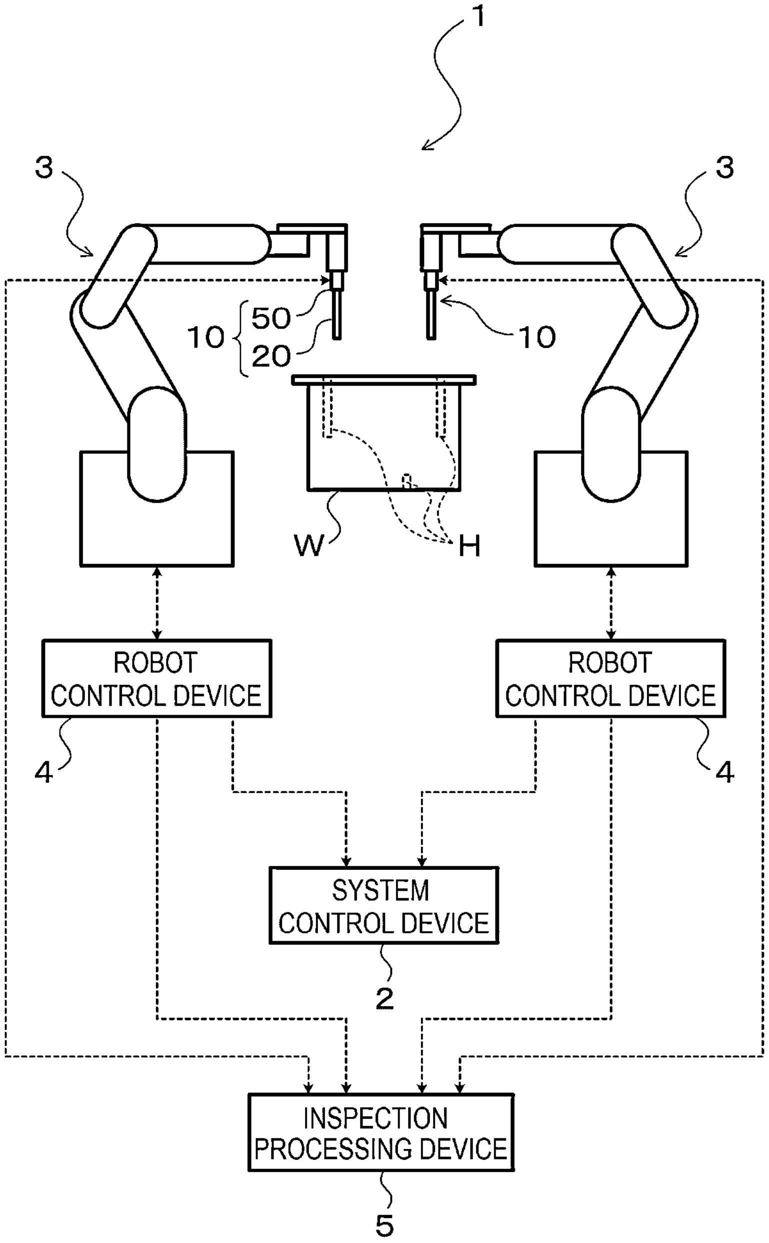
FIG. 1 is a schematic configuration diagram showing a hole inspection system to which a hole inspection lens unit of the disclosure is applied.

FIG. 1 is a schematic configuration diagram showing a hole inspection system 1 to which a hole inspection lens unit (hereinafter, simply referred to as a "lens unit") 20 of the disclosure is applied. The hole inspection system 1 shown in the drawing is used for inspection of, for example, the inside (an inner wall surface, a bottom surface, or the like) of a hole H formed in a workpiece W called a case of a transmission. The hole H to be inspected may be a round hole, a square hole, a twisted hole, a non-twisted hole, a through hole, or a non-through hole. The workpiece W is not limited to the case of the transmission.

As shown in FIG. 1, the hole inspection system 1 includes a system control device 2, a plurality of robots 3, a plurality of robot control devices 4 each connected to the system control device 2 and controlling the corresponding robot 3, and an inspection processing device 5 connected to the system control device 2. The system control device 2 includes a computer including a CPU, a ROM, a RAM, or the like, and exchanges signals (information) with the plurality of robot control devices 4 and the inspection processing device 5 to integrally control the hole inspection system 1. The robot 3 is a robot arm capable of holding and moving an imaging tool 10 including the lens unit 20 and a camera 50. The robot control device 4 includes a computer having a CPU, a ROM, a RAM, or the like, and controls the corresponding robot 3 to move the imaging tool 10 to an inspection work position above the target hole H by a predetermined distance according to a predetermined control procedure.

The inspection processing device 5 is a computer including a CPU, a ROM, a RAM, or the like. The camera 50 of the imaging tool 10 is connected to the inspection processing device 5 via a connector, a cable, or the like provided in the robot 3. Further, an inspection program for inspecting, based on an image (image data) inside the hole H captured by the camera 50, a state of the inside is installed in the inspection processing device 5. The inspection program (software) cooperates with hardware such as a CPU, a ROM, and a RAM of the inspection processing device 5 to implement, for example, a neural network for determining (diagnosing) a quality of the state inside the hole H based on the image captured by the camera 50.

Figure 2:
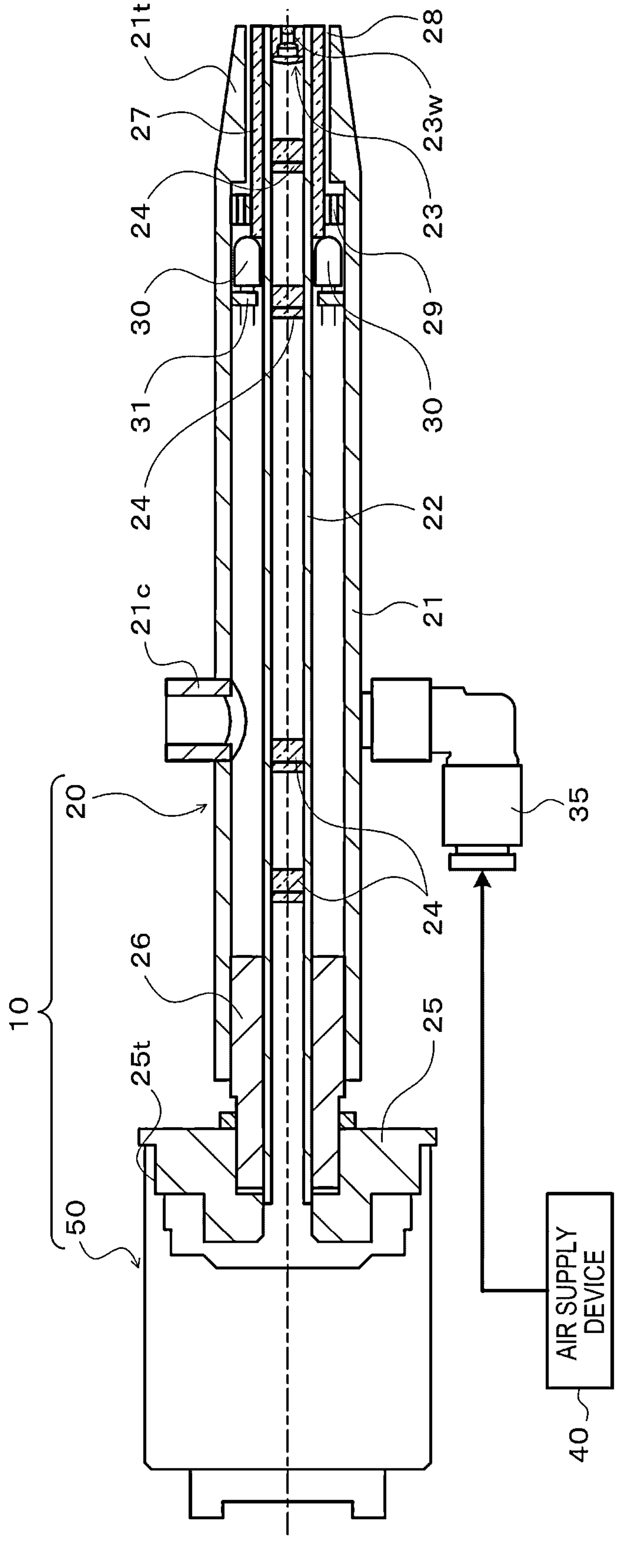
FIG. 2 is a longitudinal sectional view showing the hole inspection lens unit of the disclosure.
Figure 3:
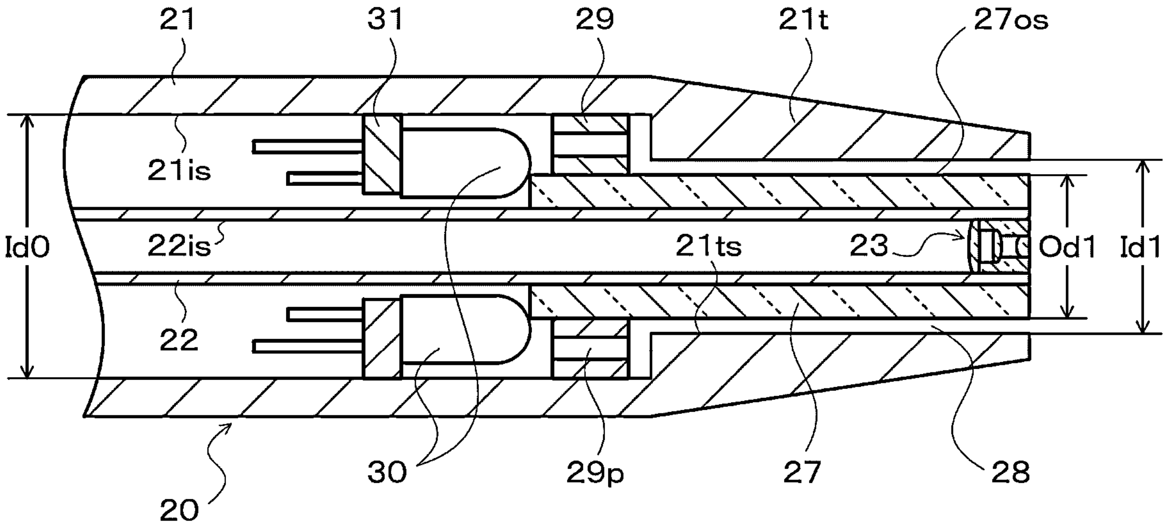
FIG. 3 is an enlarged sectional view showing a main part of the hole inspection lens unit of the disclosure.

FIG. 2 is a longitudinal sectional view showing the lens unit 20. As shown in the drawing, the lens unit 20 includes an outer tube 21, an inner tube 22, an objective lens unit 23, a plurality of relay lenses 24, a mounting unit 25 to which the camera 50 is attached, a retainer 26, a light guide tube 27, and a plurality of (for example, six in the embodiment) shell type light emitting diodes 30.

The outer tube 21 is formed into a cylindrical shape using a light-shielding material such as a metal, and a tip end portion 21*t* of the outer tube 21 is formed to be tapered. An inner diameter Id1 of the tip end portion 21*t* of the outer tube 21 is smaller than an inner diameter Id0 of a portion of the outer tube 21 on a mounting unit 25 side. The inner tube 22 is formed into a cylindrical shape having an outer diameter smaller than the inner diameter of the outer tube 21 using a light-shielding material such as a metal. In the embodiment, the inner tube 22 is formed of stainless steel, and an inner peripheral surface 22*is* of the inner tube 22 is subjected to a black oxide film or black plating (black chromium plating) according to an electrolytic coloring method. The inner tube 22 is coaxially inserted into the inside of the outer tube 21 and fixed to a proximal end portion of the outer tube 21 through the retainer 26.

The objective lens unit 23 has a wide angle lens 23*w* and is disposed (fixed) in a tip end of the inner tube 22. The plurality of relay lenses 24 are disposed at intervals in the inner tube 22 to relay images from the wide angle lens 23*w* to the camera 50 attached to the mounting unit 25. Accordingly, it is possible to focus the entire inside of the hole H. By disposing the plurality of relay lenses 24 inside the inner tube 22, it is possible to determine an axial length of the lens unit 20 according to the shape or the like of the workpiece W. For example, the axial length of the lens unit 20 for imaging the inside of the hole H formed in the bottom portion of the workpiece W can be made longer. Further, depending on the axial length required for the lens unit 20, a single relay lens 24 may be disposed in the inner tube 22, and the relay lens 24 may be omitted.

The mounting unit 25 is fixed to the retainer 26 and supports the proximal end portion of the outer tube 21 and a proximal end portion of the inner tube 22 through the retainer 26. A male screw 25*t* of a C mounting standard is formed on an outer peripheral surface of the mounting unit 25. Accordingly, various industrial cameras of different C mounting standards having different pixel numbers or the like can be attached to the mounting unit 25. Further, an industrial camera of a CS mounting standard can be attached to the mounting unit 25 through an adapter.

The light guide tube 27 is formed into a cylindrical shape that is shorter than the outer tube 21 or the like, and is formed of glass, quartz, or the like. The light guide tube 27 has an outer diameter Od1 smaller than the inner diameter Id1 of the tip end portion 21*t* of the outer tube 21 and an inner diameter slightly larger than an outer diameter of the inner tube 22. A tip end portion of the inner tube 22 is coaxially fitted into the inside of the light guide tube 27. Accordingly, the light guide tube 27 is coaxially supported by an outer peripheral surface of the inner tube 22, surrounds the tip end portion of the inner tube 22, and is surrounded by the tip end portion 21*t* of the outer tube 21 through an annular space. That is, an annular gas passage 28, which opens at an internal space of the outer tube 21 on the mounting unit 25 side and at the tip ends of the outer tube 21, the inner tube 22 and the light guide tube 27, is defined between an inner peripheral surface 21*ts* of the tip end portion 21*t* of the outer tube 21 and an outer peripheral surface 27*os* of the light guide tube 27.

An end portion of the light guide tube 27 on the mounting unit 25 side protrudes from inside of the tip end portion 21*t* into the internal space of the outer tube 21 on the mounting unit 25 side, and an annular spacer 29 is disposed between an inner peripheral surface 21*is* of the outer tube 21 and the end portion of the light guide tube 27 on the mounting unit 25 side. That is, the spacer 29 is coaxially fitted into the internal space of the outer tube 21 on the mounting unit 25 side, and the end portion of the light guide tube 27 on the mounting unit 25 side is coaxially fitted into an inner hole of the spacer 29. Accordingly, the light guide tube 27 is coaxially held by the outer tube 21 and the inner tube 22 through the spacer 29.

The spacer 29 has a plurality of gas passages 29*p* disposed at intervals (for example, at equal intervals) in a circumferential direction. In the embodiment, each gas passage 29*p* is a round hole extending in an axial direction of the spacer 29. However, the gas passage 29*p* may be, for example, a recessed portion (cutout) formed in an inner peripheral surface of the spacer 29. When the spacer 29 is disposed between the outer tube 21 and the light guide tube 27, the gas passage 29*p* extends in the axial direction of the lens unit 20 along the outer tube 21, the inner tube 22, and the light guide tube 27, and communicates with the annular gas passage 28 between the tip end portion 21*t* of the outer tube 21 and the light guide tube 27.

The plurality of shell type light emitting diodes 30 are disposed inside the outer tube 21 and around the inner tube 22 at intervals (for example, at equal intervals) to face (abut) the end portion of the light guide tube 27 on the mounting unit 25 side in the spacer 29 on the mounting unit 25 side. A terminal of each shell type light emitting diode 30 is connected to an annular substrate 31, and the plurality of shell type light emitting diodes 30 are connected in series or in parallel. The substrate 31 is disposed on light emitting units of the plurality of shell type light emitting diodes 30 on the mounting unit 25 side, and a cable (not shown) for supplying power to the shell type light emitting diodes 30 is connected to the substrate 31. The cable is led out to the outside of the outer tube 21 through a space between the outer tube 21 and the inner tube 22 and a cable lead-out portion 21*c* formed in the outer tube 21, and is connected to an illuminance power source (not shown) through a connector.

Further, an air pipe joint 35 is connected to the outer tube 21 to communicate with the space between the outer tube 21 and the inner tube 22, between the mounting unit 25 and the substrate 31 in the axial direction. The air pipe joint 35 is connected to an air supply device 40 through an air hose or the like. The air supply device 40 is controlled by, for example, the system control device 2. By operating the air supply device 40, air can be supplied from the air pipe joint 35 to the space between the outer tube 21 and the inner tube 22.

When the inside of the hole H formed in the workpiece W is imaged by the camera 50 using the lens unit 20 configured as described above, the lens unit 20, in which the camera 50 is attached to the imaging tool 10, that is, the mounting unit 25, is moved by the robot 3 and stopped at the inspection work position such that the objective lens unit 23 (wide angle lens 23*w*) is positioned above the hole H by the predetermined distance. Further, each of the shell type light emitting diodes 30 is caused to emit light. The shell type light emitting diode 30 is excellent in light-gathering property, and the light emitted from the shell type light emitting diode 30 is emitted while being diffused into the hole H by the tubular light guide tube 27. Accordingly, when the inside of the hole H of the workpiece W is imaged by the camera 50, uniform illuminance inside the hole H can be ensured, and noise such as a line of light of an image captured by the camera 50 can be significantly reduced.

In the lens unit 20, the light guide tube 27 is surrounded by the tip end portion 21*t* of the outer tube 21, and is supported by the outer peripheral surface of the inner tube 22 to surround the tip end portion of the inner tube 22. Further, the annular spacer 29 having the plurality of gas passages 29*p* is disposed between the inner peripheral surface 21*is* of the outer tube 21 and the light guide tube 27. The plurality of gas passages 29*p* of the spacer 29 extend along the light guide tube 27 or the like. The annular gas passage 28, which communicates with the plurality of gas passages 29*p* of the spacer 29 and opens at the tip ends of the outer tube 21, the inner tube 22, and the light guide tube 27, is defined between the inner peripheral surface 21*ts* of the tip end portion 21*t* of the outer tube 21 and the outer peripheral surface 27*os* of the light guide tube 27.

Figure 4:
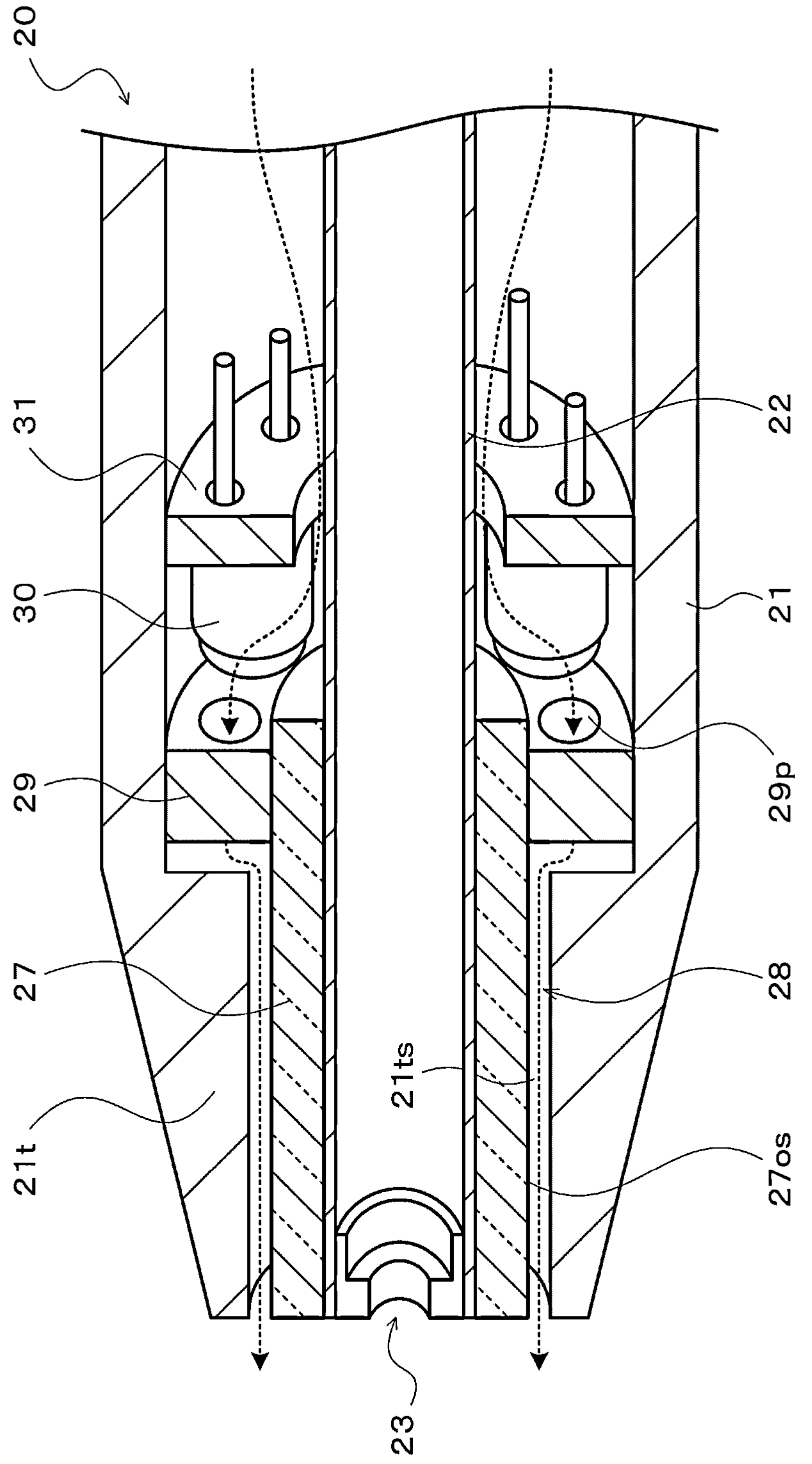
FIG. 4 is a perspective view showing the main part of the hole inspection lens unit of the disclosure.

Accordingly, when the inside of the hole H of the workpiece W is imaged by the camera 50, by operating the air supply device 40, as indicated by dotted lines in FIG. 4, the air can be supplied from the air pipe joint 35 to the annular gas passage 28 through the space between the outer tube 21 and the inner tube 22, a gap between an inner hole of the substrate 31 and the inner tube 22, a gap between the plurality of shell type light emitting diodes 30 and the inner tube 22, and the plurality of gas passages 29*p* of the spacer 29, and the air can be ejected into the hole H from between the outer tube 21 and the inner tube 22. As a result, as compared with the case where the air is ejected from an outer periphery of the outer tube 21 toward the hole H, it is possible to satisfactorily remove foreign matters such as water droplets (cleaning liquid) and chips present inside the hole H while preventing adhesion of the foreign matters to the objective lens unit 23 (wide angle lens 23*w*).

Further, in the lens unit 20, when the air supplied to the annular gas passage 28 is rectified by the plurality of gas passages 29*p* of the spacer 29, a flow velocity of the air ejected from the annular gas passage 28 toward the hole H can be increased by adjusting a passage cross-sectional area (opening area) of the plurality of gas passages 29*p*. Accordingly, according to the lens unit 20, when the inside of the hole H of the workpiece W is imaged by the camera 50, the noise of the image to be captured is reduced while ensuring the uniform illuminance inside the hole H, and the foreign matters present inside the hole H can be satisfactorily removed.

In the lens unit 20, the light guide tube 27 has the outer diameter Od1 smaller than the inner diameter Id1 of the tip end portion 21*t* of the outer tube 21, and is supported by an outer peripheral surface of the tip end portion of the inner tube 22 such that the annular gas passage 28 is defined between the inner peripheral surface 21*ts* of the tip end portion 21*t* of the outer tube 21 and the outer peripheral surface 27*os* of the light guide tube 27. Accordingly, by supporting the light guide tube 27 by the inner tube 22, the light guide tube 27 can be aligned accurately with respect to the inner tube 22, that is, the objective lens unit 23 (wide angle lens 23*w*). Therefore, the light emitted from the light guide tube 27 and reflected inside the hole H can be uniformly incident on the objective lens unit 23 (wide angle lens 23*w*). Accordingly, the inside of the hole H can be imaged with high accuracy by the camera 50.

In addition, when a plurality of different types of lens units not including the annular gas passage 28 are manufactured from a plurality of outer tubes having different inner diameters of tip end portions and a plurality of light guide tubes having different outer diameters, the lens unit 20 including the annular gas passage 28 can be easily manufactured by combining an outer tube having a relatively large inner diameter of a tip end portion and a light guide tube having a relatively small outer diameter. That is, by adopting a structure in which the light guide tube 27 is supported by the inner tube 22, the outer tube 21, the inner tube 22, the light guide tube 27, or the like can be shared by the lens unit 20 including the annular gas passage 28 and the lens unit not including the annular gas passage 28.

Further, in the lens unit 20, both the outer tube 21 and the inner tube 22 have a light-shielding property, and the light guide tube 27 is accurately aligned with respect to the inner tube 22, that is, the objective lens unit 23 (wide angle lens 23*w*). Accordingly, the light from the plurality of shell type light emitting diodes 30 is uniformly diffused into the hole H by the light guide tube 27, and the light emitted from the light guide tube 27 and reflected inside the hole H can be uniformly incident on the objective lens unit 23. Therefore, the inside of the hole H is imaged with high accuracy by the camera 50, and the noise of the captured image can be satisfactorily reduced.

Further, the lens unit 20 includes the annular substrate 31 to which the terminals of the plurality of shell type light emitting diodes 30 are connected. The inner diameter Id1 of the tip end portion 21*t* of the outer tube 21 is smaller than the inner diameter Id0 of the portion of the outer tube 21 on the mounting unit 25 side. The spacer 29 is disposed between the inner peripheral surface 21*is* of the outer tube 21 and the outer peripheral surface 27*os* of the light guide tube 27 such that the spacer 29 is positioned on the mounting unit 25 side of the tip end portion 21*t* of the outer tube 21 and on an objective lens unit 23 side of the plurality of shell type light emitting diodes 30. Further, the annular gas passage 28 is supplied with air from the air pipe joint 35 through the space between the outer tube 21 and the inner tube 22, the gap between the inner hole of the substrate 31 and the inner tube 22, the gap between the plurality of shell type light emitting diodes 30 and the inner tube 22, and the plurality of gas passages 29*p* of the spacer 29 (see FIG. 4).

That is, in the lens unit 20, the spacer 29 is disposed in a portion on the mounting unit 25 side having the inner diameter Id0 larger than the inner diameter Id1 of the tip end portion 21*t* of the outer tube 21. A degree of freedom in disposing the plurality of gas passages 29*p* in the spacer 29 is increased. Accordingly, it is possible to more effectively rectify the air from the plurality of shell type light emitting diodes 30 by the plurality of gas passages 29*p* of the spacer 29. In addition, in the lens unit 20, an arrangement space of the plurality of shell type light emitting diodes 30 corresponding to a requested light amount is ensured in the portion of the outer tube 21 on the mounting unit 25 side. By adjusting the inner diameter of the tip end portion 21*t* of the outer tube 21 and the outer diameter of the light guide tube 27, a light guide performance of the light guide tube 27 and an air ejection performance of the annular gas passage 28 can be appropriately set.

In the lens unit 20, the inner tube 22 is formed of stainless steel, and the black oxide film or black plating is applied to the inner peripheral surface 22*is* of the inner tube 22. Accordingly, since it is possible to prevent scattering of light from the wide angle lens 23*w* (hole H) toward the camera 50, that is, stray light inside the inner tube 22, the camera 50 can more accurately image the inside of the hole H.

Figure 5:
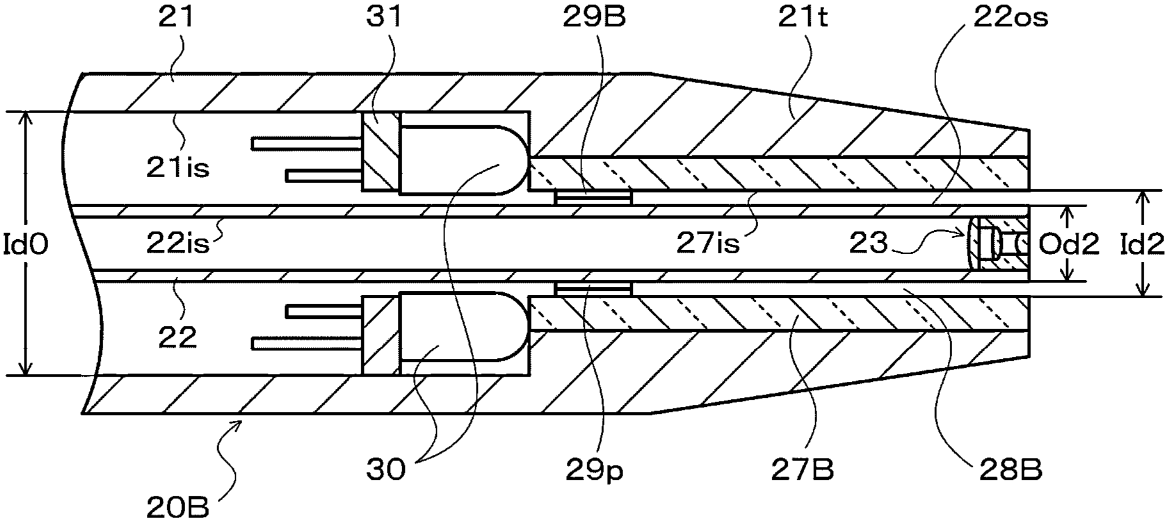
FIG. 5 is an enlarged sectional view showing a main part of another hole inspection lens unit of the disclosure.

FIG. 5 is a schematic configuration diagram showing another lens unit 20B of the disclosure. Among the components of the lens unit 20B, the same components as those of the above-described lens unit 20 are denoted by the same reference numerals, and redundant description thereof will be omitted.

As shown in FIG. 5, a light guide tube 27B of the lens unit 20B has an inner diameter Id2 larger than an outer diameter Od2 of the tip end portion of the inner tube 22 and an outer diameter slightly smaller than the inner diameter of the tip end portion 21*t* of the outer tube 21, and is coaxially fitted into the tip end portion 21*t* of the outer tube 21. Accordingly, the light guide tube 27B is coaxially supported by the inner peripheral surface of the tip end portion 21*t* of the outer tube 21, is surrounded by the tip end portion 21*t*, and surrounds the tip end portion of the inner tube 22 via the annular space. That is, an annular gas passage 28B, which opens at the internal space of the outer tube 21 on the mounting unit 25 side and at the tip ends of the outer tube 21, the inner tube 22, and the light guide tube 27B, is defined between an inner peripheral surface 27*is* of the light guide tube 27B and an outer peripheral surface 22*os* of the tip end portion of the inner tube 22.

An annular spacer 29B is disposed between the outer peripheral surface 22*os* of the inner tube 22 and the inner peripheral surface 27*is* of the light guide tube 27B to be close to the plurality of shell type light emitting diodes 30. That is, the spacer 29B is coaxially fitted into an internal space of the light guide tube 27B, and the inner tube 22 is coaxially fitted into an inner hole of the spacer 29B. Accordingly, the light guide tube 27B is coaxially held by the outer tube 21 and the inner tube 22 through the spacer 29B. The spacer 29B also has the plurality of gas passages 29*p* disposed at intervals (for example, at equal intervals) in the circumferential direction. In the embodiment, each gas passage 29*p* is, for example, a groove formed in an inner peripheral surface of the spacer 29B to extend in the axial direction of the spacer 29. When the spacer 29 is disposed between the inner tube 22 and the light guide tube 27B, the gas passage 29*p* extends in the axial direction of the lens unit 20 along the outer tube 21, the inner tube 22, and the light guide tube 27B, and communicates with the annular gas passage 28B between the inner tube 22 and the light guide tube 27B.

When the inside of the hole H formed in the workpiece W is imaged by the camera 50 using the lens unit 20B configured as described above, by operating the air supply device 40, air is supplied to the annular gas passage 28B through the space between the outer tube 21 and the inner tube 22, the gap between the inner hole of the substrate 31 and the inner tube 22, the gap between the plurality of shell type light emitting diodes 30 and the inner tube 22, and the plurality of gas passages 29*p* of the spacer 29B, and the air can be ejected into the hole H from between the outer tube 21 and the inner tube 22. As a result, as compared with the case where the air is ejected from the outer periphery of the outer tube 21 toward the hole H, it is possible to effectively remove foreign matters such as water droplets and chips present inside the hole H, and also to effectively prevent the foreign matters, which are discharged to the outside of the hole H in response to the ejection of gas, from adhering to the objective lens unit 23.

A hole inspection lens unit according to this disclosure is a hole inspection lens unit used for inspection inside a hole formed in a workpiece. The hole inspection lens unit includes: a tubular outer tube; a tubular inner tube inserted into the outer tube; an objective lens disposed in a tip end of the inner tube; a mounting unit which supports a proximal end portion of the outer tube and a proximal end portion of the inner tube and on which a camera configured to image the inside of the hole through the objective lens is attached; a plurality of shell type light emitting diodes disposed inside the outer tube and around the inner tube; a tubular light guide tube which is surrounded by a tip end portion of the outer tube and supported by one of an outer peripheral surface of the inner tube and an inner peripheral surface of the outer tube to surround a tip end portion of the inner tube, and emits light emitted from the plurality of shell type light emitting diodes on a mounting unit side while diffusing the light into the hole; an annular spacer which has a plurality of gas passages and is disposed between the light guide tube and the other one of the outer peripheral surface of the inner tube and the inner peripheral surface of the outer tube such that the plurality of gas passages extend along the light guide tube; and an annular gas passage which is defined between the inner peripheral surface of the outer tube and an outer peripheral surface of the light guide tube or between the outer peripheral surface of the inner tube and an inner peripheral surface of the light guide tube, communicates with the plurality of gas passages of the spacer, and opens at the tip ends of the outer tube and the inner tube.

When the inside of the hole formed in the workpiece is imaged by the camera using the hole inspection lens unit of the disclosure, the hole inspection lens unit in which the camera is attached to the mounting unit is stopped such that the objective lens is positioned above the hole. Further, each of the shell type light emitting diodes is caused to emit light. The shell type light emitting diode is excellent in light-gathering property, and the light emitted from the shell type light emitting diode is emitted while being diffused into the hole by the tubular light guide tube. Accordingly, when the inside of the hole of the workpiece is imaged by the camera, noise of an image captured by the camera can be reduced while ensuring uniform illuminance inside the hole. In the hole inspection lens unit of the disclosure, the light guide tube is surrounded by the tip end portion of the outer tube, and supported by one of the outer peripheral surface of the inner tube and the inner peripheral surface of the outer tube to surround the tip end portion of the inner tube. Further, the annular spacer having the plurality of gas passages is disposed between the light guide tube and the other one of the outer peripheral surface of the inner tube and the inner peripheral surface of the outer tube, and the plurality of gas passages of the spacer extend along the light guide tube. The annular gas passage, which communicates with the plurality of gas passages of the spacer and opens at the tip ends of the outer tube and the inner tube, is defined between the outer peripheral surface of the light guide tube and the inner peripheral surface of the outer tube, or between the inner peripheral surface of the light guide tube and the outer peripheral surface of the inner tube. Accordingly, when the inside of the hole of the workpiece is imaged by the camera, a gas is supplied to the annular gas passage through the plurality of gas passages of the spacer, and thus the gas can be ejected into the hole from between the outer tube and the inner tube. As a result, as compared with the case where the gas is ejected from the outer periphery of the outer tube toward the hole, it is possible to satisfactorily remove foreign matters present inside the hole while preventing the adhesion of the foreign matters to the objective lens. In addition, in the hole inspection lens unit of the disclosure, when the gas supplied to the annular gas passage is rectified by the plurality of gas passages of the spacer, a flow velocity of the gas ejected from the annular gas passage toward the hole can be increased by adjusting a passage cross-sectional area of the plurality of gas passages. Accordingly, according to the hole inspection lens unit of the disclosure, when the inside of the hole of the workpiece is imaged by the camera, the noise of the image to be captured is reduced while ensuring uniform illuminance inside the hole, and the foreign matters present inside the hole can be satisfactorily removed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

INDUSTRIAL APPLICABILITY

The disclosure is extremely useful for inspecting the inside of a hole formed in a workpiece in a manufacturing industry.

What is claimed is:

1. A hole inspection lens unit used for inspection inside a hole formed in a workpiece, the hole inspection lens unit comprising:

a tubular outer tube;

a tubular inner tube inserted into the outer tube;

an objective lens disposed in a tip end of the inner tube;

a mounting unit which supports a proximal end portion of the outer tube and a proximal end portion of the inner tube and on which a camera configured to image the inside of the hole through the objective lens is attached;

a plurality of shell type light emitting diodes disposed inside the outer tube and around the inner tube;

a tubular light guide tube which is surrounded by a tip end portion of the outer tube and supported by one of an outer peripheral surface of the inner tube and an inner peripheral surface of the outer tube to surround a tip end portion of the inner tube, and emits light emitted from the plurality of shell type light emitting diodes on a mounting unit side while diffusing the light into the hole;

an annular spacer which has a plurality of gas passages and is disposed between the light guide tube and the other one of the outer peripheral surface of the inner tube and the inner peripheral surface of the outer tube such that the plurality of gas passages extend along the light guide tube; and an annular gas passage which is defined between the inner peripheral surface of the outer tube and an outer peripheral surface of the light guide tube or between the outer peripheral surface of the inner tube and an inner peripheral surface of the light guide tube, communicates with the plurality of gas passages of the spacer, and opens at the tip ends of the outer tube and the inner tube.

2. The hole inspection lens unit according to claim 1, wherein an outer diameter of the light guide tube is smaller than an inner diameter of the tip end portion of the outer tube, the light guide tube is supported by an outer peripheral surface of the tip end portion of the inner tube, and the annular gas passage is defined between an inner peripheral surface of the tip end portion of the outer tube and the outer peripheral surface of the light guide tube.

3. The hole inspection lens unit according to claim 2, further comprising:

an annular substrate to which terminals of the plurality of shell type light emitting diodes are connected, wherein the inner diameter of the tip end portion of the outer tube is smaller than an inner diameter of a portion of the outer tube on the mounting unit side, the spacer is disposed between the inner peripheral surface of the outer tube and the outer peripheral surface of the light guide tube such that the spacer is positioned on the mounting unit side of the tip end portion of the outer tube and on an objective lens side of the plurality of shell type light emitting diodes, and the annular gas passage is supplied with air through a space between the outer tube and the inner tube, a gap between an inner hole of the substrate and the inner tube, a gap between the plurality of shell type light emitting diodes and the inner tube, and the plurality of gas passages of the spacer.

4. The hole inspection lens unit according to claim 1, wherein the inner tube is formed of stainless steel, and a black oxide film or black plating is applied to an inner peripheral surface of the inner tube.

5. The hole inspection lens unit according to claim 2, wherein the inner tube is formed of stainless steel, and a black oxide film or black plating is applied to an inner peripheral surface of the inner tube.

6. The hole inspection lens unit according to claim 3, wherein the inner tube is formed of stainless steel, and a black oxide film or black plating is applied to an inner peripheral surface of the inner tube.

7. The hole inspection lens unit according to claim 1, wherein the tubular light guide tube is surrounded by the tip end portion of the outer tube through an annular space.

* * * * *